United States Patent [19]

Lehmler et al.

[11] Patent Number: 4,615,510
[45] Date of Patent: Oct. 7, 1986

[54] DEVICE FOR TRANSPORTING PROFILES

[75] Inventors: Hansfriedrich Lehmler, Bad Homburg; Gunter Wilkens, Kelkheim, both of Fed. Rep. of Germany

[73] Assignee: Oxytechnik, Fed. Rep. of Germany

[21] Appl. No.: 740,637

[22] Filed: Jun. 3, 1985

[30] Foreign Application Priority Data

Jul. 31, 1985 [DE] Fed. Rep. of Germany ....... 3428139

[51] Int. Cl.$^4$ .............................................. B23K 7/00
[52] U.S. Cl. ......................................... 266/48; 266/65
[58] Field of Search ...................... 266/48, 65; 269/17, 269/289 MR; 83/409, 409.1, 435.1

[56] References Cited

U.S. PATENT DOCUMENTS

| 3,481,591 | 12/1969 | Dieker | 266/48 |
| 3,666,249 | 5/1972 | MacLeod, Jr. | 266/65 |
| 3,701,514 | 10/1972 | Walters et al. | 266/48 |
| 3,977,298 | 8/1976 | Linsinger | 83/435.1 |
| 3,999,744 | 12/1976 | Kotch | 266/48 |

Primary Examiner—Wayland Stallard
Attorney, Agent, or Firm—Connolly and Hutz

[57] ABSTRACT

A device is provided for transporting profiles, such as T, U, I, angle, flat and Holland profiles, in profile processing lines particularly lines which include marking and torch cutting equipment. The transport device is in the form of a car having at least one profile carrier.

20 Claims, 3 Drawing Figures

DEVICE FOR TRANSPORTING PROFILES

BACKGROUND OF THE INVENTION

Profile or workpiece processing lines basically consist of sequentially arranged marking and torch cutting and/or drilling stations as well as one of the related loading, unloading and transloading equipment. The profile to be processed is brought to the individual processing machines/loading, unloading, transloading device by means of transport equipment. The transport vehicle simultaneously serves as a storage table for the workpiece. The manufacturing precision of the profile to be processed and the costs incurred along the profile processing line depend on the means of transportation.

Processing lines are known where roller tables are used as means of transporting profiles; these must be realigned and aligned according to the design of the profile. Thereby, the profiles are realigned at each work station by means of buffers and/or special devices arranged on the roller table, whereby the relative position of the profile to be processed is redefined each time by means of sensors. This process is repeated at each one of the stations along the profile processing line. The alignment of profiles which in actuality warped, is particularly time-consuming. The position of the profiles must be redefined at each processing station, whereby particularly the center of gravity of the profile must be established at the loading and unloading stations. Furthermore, holding problems will occur if the profiles are cut into several pieces by means of e.g., a torch cutting device.

SUMMARY OF THE INVENTION

An object of the invention os to create a device for transporting profiles along profile lines, by means of which only one single alignment of the profiles is required and by means of which only one single alignment of the profiles is required and by means of which a higher level of manufacturing precision is achieved with concurrent decrease of the installation costs.

It is an additional object of the invention to develop the device for simultaneous dross transport.

These problems are solved by means of a device of this type which in its broadest practice involves forming the transport device as a car having at least one profile carrier.

In order to facilitate transport of the dross in the most simple manner possible and without interruption of the processing, an additional form of the car according to the invention includes a bottom trough. For purposes of emptying the bottom trough at a predetermined location, the car and the bottom trough are formed as one structural unit and can be turned around a longitudinal axis of the car.

The advantages achieved by means of the invention consist particularly therein that the profiles, which are up to 15 m long and cover a wide tolerance range, need be aligned only once. This leads to narrower manufacturing tolerances with a simpler and more cost-efficient design of the profile processing line. Instead of e.g., the numerous and expensive rollers of a roller table, one will need only a number of wheels corresponding to a number of cars. Due to the unity of profile and means of transportation in each process, the positioning will be simplified.

THE DRAWINGS

DETAILED DESCRIPTION

Figure 1:
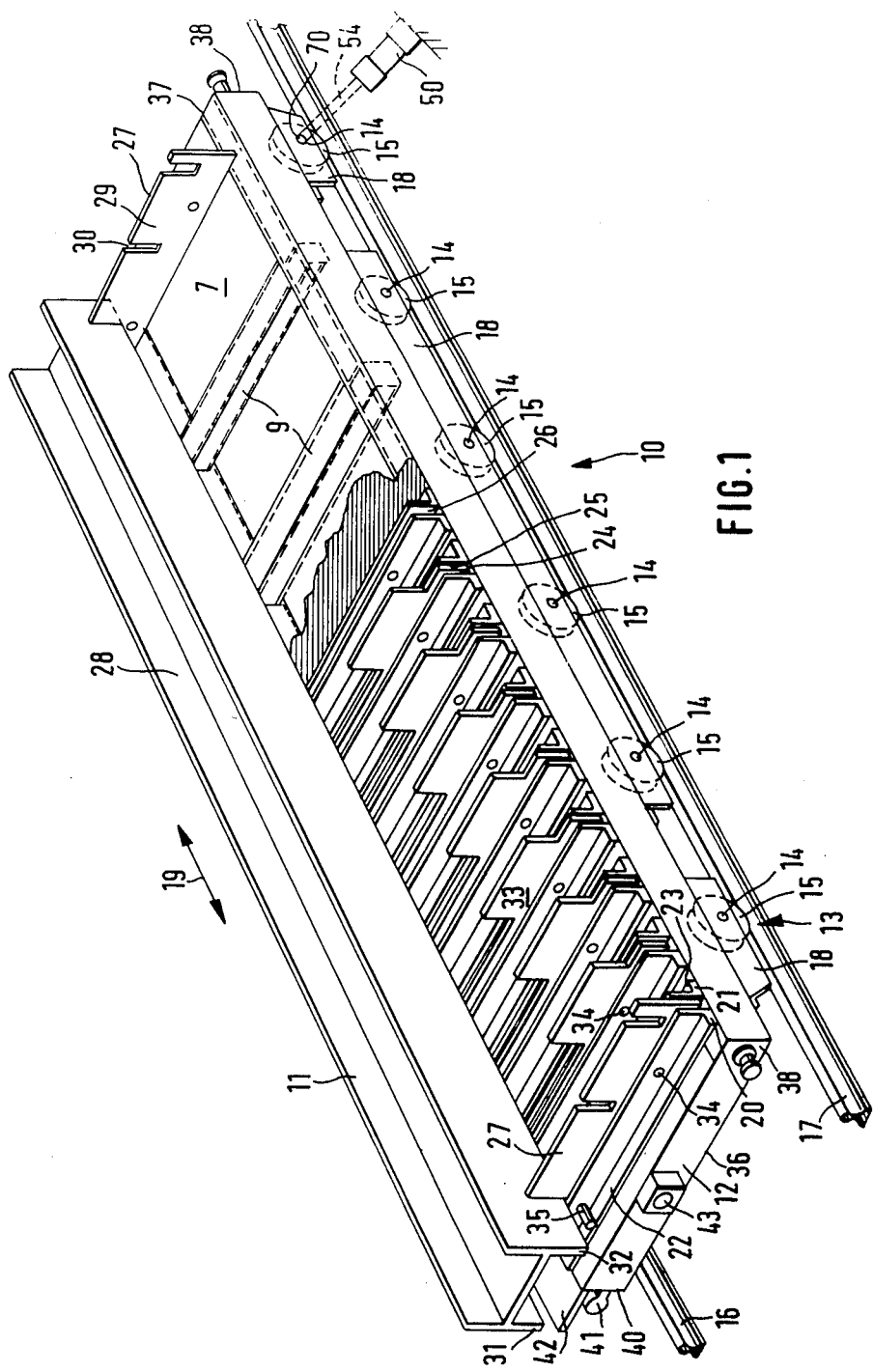
FIG. 1 is a perspective view of a car for transportation of double T-beams in a profile processing line.

FIG. 1 shows in detail a car 10 for transportation of the profiles 11. Basically, the car 10 consists of a frame 12 developed as a welded structure, which is stiffened by means of transverse tie bars 9 and on which a bottom trough 7 is attached. The bottom trough 7 consists of exchangeable metal sheets arranged between the transverse tie bars 9. When cutting with water plasma, it is advantageous to develop the bottom trough 7 as a receptable and a discharge line for cooling water. Thereby, the bottom of the bottom trough 7 is advantageously inclined, and a water discharge opening is provided at the lowest point. On the bottom side of the car 10, the chassis 13 which rests in bearings in floor beams, is connected with the frame 12. The chassis 13 of the car consists of several rigid axles 14 on which the wheels 15 are mounted in roller bearings. By means of two wheel flanges, each wheel 15 engages with the rails 16 and 17 which are fixed on the floor. Preferably, the rails 16 and 17 which are installed on or in the floor 72 of the structure or hall 73 (FIG. 3) are developed as crane rails which render high loads possible due to the broad head and the stable installation with a wide foot. By placing the rails in the floor 72 of the hall 73, the profile processing line 44 can easily be crossed by e.g., loading and unloading vehicles. In order to prevent wear on the wheel flanges, the wheels 15 may advantageously have a conical running surface. On the bottom side of the frame 12, wheel boxes 18 are provided in order to protect the rails 16, 17 and the wheels 15 against damages, particularly from dross and scrap metal.

In longitudinal direction on the frame 12 (double arrow 19) two angle profiles 20, 21 are attached, one behind the other. The angle profiles 20, 21 are arranged on the frame 12 in such a manner that the legs 22, 23 of the angel profiles 20, 21 are oriented outwards in the direction of the double arrow 19, so that the faces 24, 25 of the angle profiles 20, 21 form a slot-shaped opening across the frame 12. In these slot-shaped openings 26 which serve as holding devices 8, at least two profile carriers 27 are attached to support the profiles 11.

FIG. 1 shows the profiles of a double T-beam 28 which is attached in grouse plates 29. Preferably, the grouser plates 29 are arranged in the rear and front slot-shaped openings 26 on the car 10. For accommodation of the double T-beam 28, the grouser plates 29 are provided with slots 30, in which the double T-beam 28 is accommodated by means of its welded-on flanges 31, 32. Hereby, the number of grouser plates 29 and/or the use of support plates 33 is dependent on the shape of the profile 11 and the predetermined processing sequences, particularly by the number of torch cuts and thus by the dimensions of the individual profile sections. Alignment borings 34 are provided in the angle profiles 20, 21 forming the slot-shaped opening 26 as well as in the grouser and support plates 29, 33. By inserting a bolt 35 in the alignment borings 34 in the angle profiles 20, 21 and the grouser or support plates 29, 33, one achieves a correct positioning of the exchangeable profile holder 27. On each one of the faces 36, 37 of the frame 12 and across from an outer end 38, there is a fixed connection between the frame 12 and the hook accommodation bolt 39. Attached on the oposite longitudinal side 40 of the hook accommodation bolt 39 is a swing rail 41 which is developed as a hinge. Above the swing rail 41, a cover plate 42 is attached to protect the swing rail. A coupling 43 for connecting several cars 10 is provided on each one of the faces 36, 37.

Figure 2:
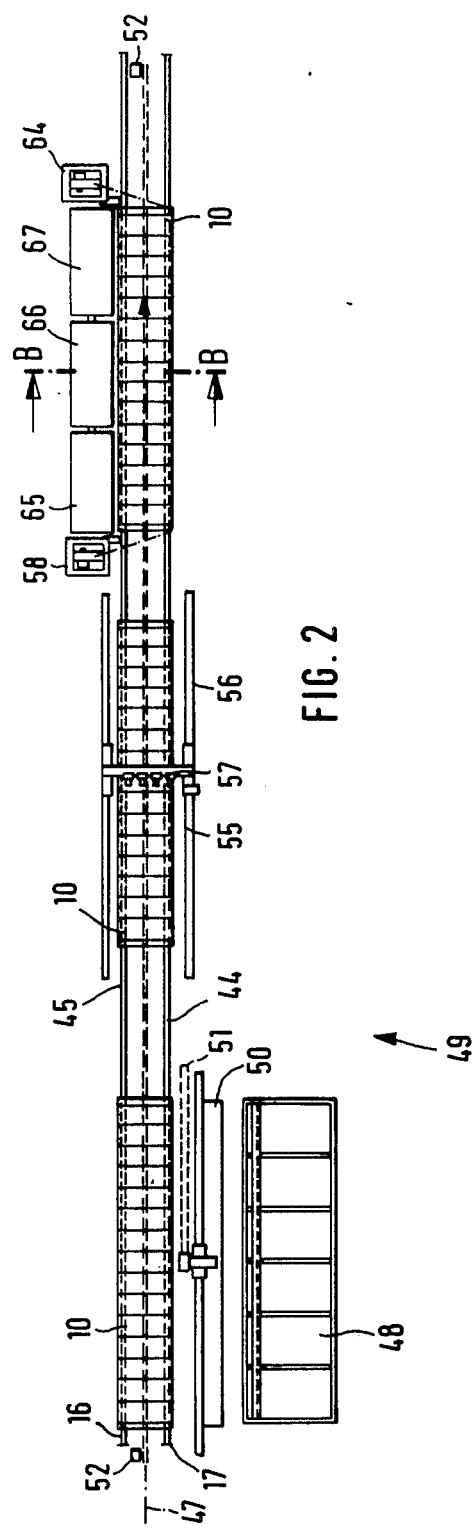
FIG. 2 is a schematic top plan view of the installation for processing the profile.

FIG. 2 shows an installation 49 for processing of profiles 11. The profile processing line 44 preferably consists of a torch cutting line 45 in which the processing stations are arranged sequentially after one another. The profiles 11 are stored in a warehousing area 48 of the installation 49 and loaded onto the cars 10 by means of a wall crane 46 in the hall. The profile 11 or the profiles are aligned and fastened on the car 10 which is provided with corresponding grouser plates 29 and support plates 33. At the beginning of the torch cutting line 45, there are a marking machine 50 of which the swing boom 51 can be turned out over the car 10 and consequently over the profile 11. Prior to the marking, the car 10 is brought into a reference position in relation to the marking machine 50. Thereby, as is merely shown schematically in FIG. 2 to illustrate the principle, a hydraulically activated bolt 54 preferably a conical bolt connected to the marking machine 50, engages into an alignment boring 70 provided on the car 10. Preferably, the alignment boring 70 is provided in one of the axles 14 (FIG. 1) of the car 10.

The geometry of the workpiece, according to which the profile is marked is stored in the NC equipment of the marking device.

Figure 3:
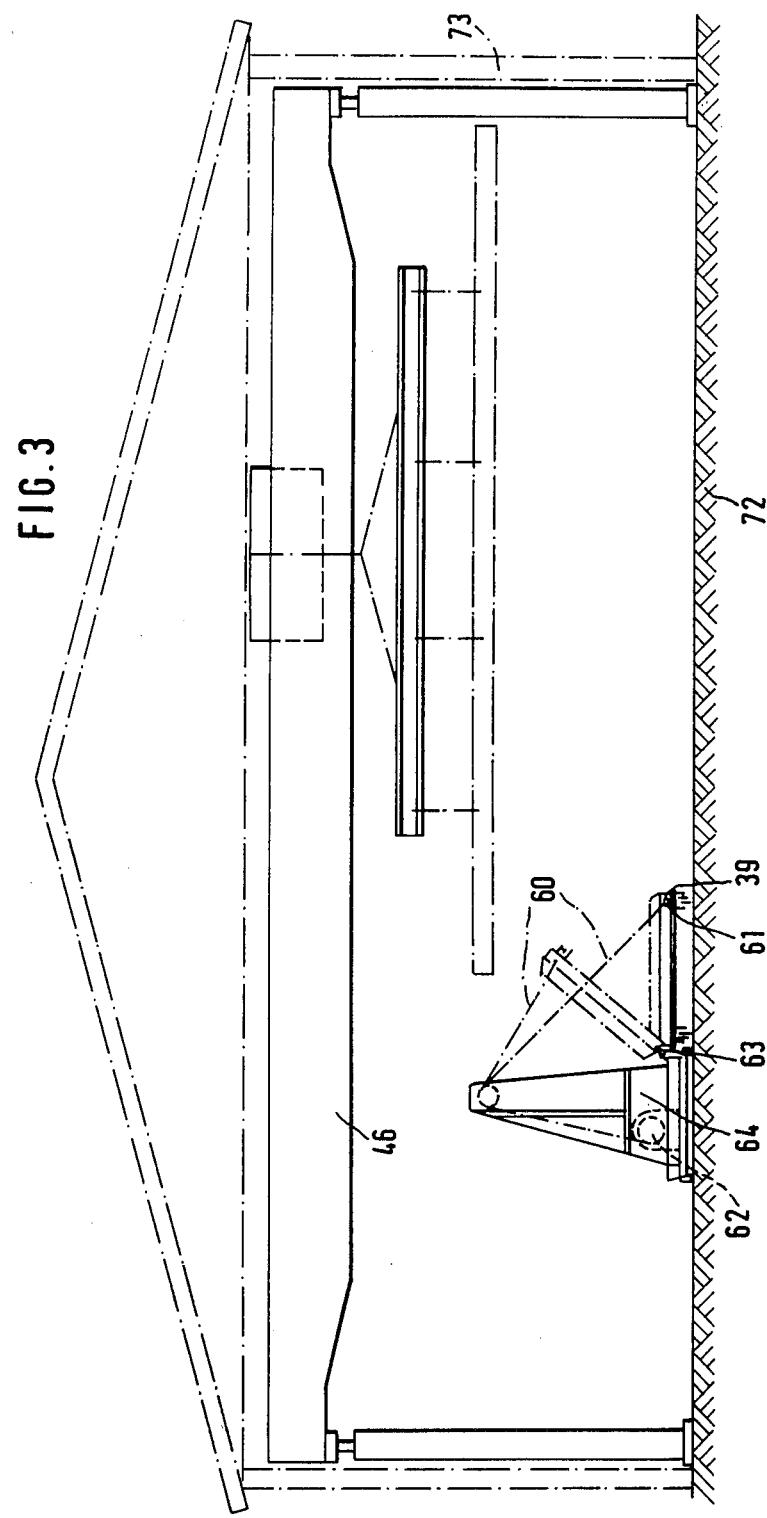
FIG. 3 is a cross-section view along the line B—B of FIG. 2.

After the completion of the marking procedure, the car 10 is pulled by the pull drives 52 which are provided on the profile processing line 44 preferably at the rail center 47 to a position below a torch cutting device 55 by means of a pulling hook attached on its bottom side. Thereby, the torch cutting device 55 may be a portal cutter 56 or a robot carrying a flame cutter 57 (e.g., a plasma flame cutter, autogeneous flame cutter etc.). Here, the car 10 is similarly aligned by means of a conical bolt, and the profile 11 is cut in accordance with the predetermined NC values. It is particularly advantageous that, due to the design of the car 10 described above, no repeated alignment must be undertaken, since the individual parts are held by the grouser plates 29. The dross generated during the flame cutting as well as the scrap metal pieces will fall into the bottom trough 7 of the car 10. Subsequently, the car 10 is pulled to an end position. Hereby, when it is advanced to the end of the profile processing line 44, the car 10 engages its swing rail 41 into a counter-bearing attached in one of the lift devices 58, 64 (FIG. 3). Between the lift devices 58, 64, which are preferably identical, containers 65, 66, 67 are located to accommodate the dross and remove it. Naturally, it is also possible to attach the counter-bearing of the swing rail 41 to these containers 65, 66, 67. Each one of the hooks 61 of the lift devices 58, 64 which hooks are attached to a pull rope 60 will be disengaged from the lift drive 62 and hung into the hook accommodation bolts 49 of the car 10. Subsequently, the car is turned around its longitudinal axis 63 by means of hauling in the pull rope 60 so that the scrap metal and the dross can be removed from the bottom trough 7.

What is claimed is:

1. A device for the transport of profiles such as T, U, I, angle, flat and Holland profiles in a profile processing line, particularly processing lines with marking and torch cutting equipment installed in the transport chain, as well as loading, unloading and transloading devices, the improvement being said transport device being in the form of a car which has at least one profile carrier.

2. Device according to claim 1, characterized thereby that said car has a bottom trough.

3. Device according to claim 2, characterized thereby that the bottom trough is formed to accommodate and discharge cooling water.

4. Device according to claim 3, characterized thereby that said profile carriers and said bottom trough are formed as a single structural unit and can be swung around the longitudinal axis of said car.

5. Device according to claim 2, characterized thereby that said profile carriers and said bottom trough are formed as a single structural unit and can be swung around the longitudinal axis of said car.

6. Device according to claim 3, characterized thereby that said profile carriers and said bottom trough are formed as a separate unit which is attached to the chassis of said car in such a manner that it can swing.

7. Device according to claim 2, characterized thereby that said profile carriers and said bottom trough are formed as a separate unit which is attached to the chassis of said car in such a manner that it can swing.

8. Device according to claim 6, characterized thereby that said car is formed as a rail-bound transport device.

9. Device according to claim 4, characterized thereby that said car is formed as a rail-bound transport device.

10. Device according to claim 1, characterized thereby that said car is formed as a rail-bound transport device.

11. Device according to claim 6, characterized thereby that said car is formed as a floor-bound transport device.

12. Device according to claim 4, characterized thereby that said car is formed as a floor-bound transport device.

13. Device according to claim 1, characterized thereby that said car is formed as a floor-bound transport device.

14. Device according to claim 11, characterized thereby that positioning devices are provided at at least one torch cutting processing machine and on each car for determining the relative positions of the processing machine and car.

15. Device according to claim 8, characterized thereby that positioning devices are provided at at least one torch cutting processing machine and on each car for determining the relative positions of the processing machine and car.

16. Device according to claim 1, characterized thereby that positioning devices are provided at at least one torch cutting processsing machine and on each car for determining the relative positions of the processing machine and car.

17. Device according to claim 14, characterized thereby that said profile carriers are formed as grouser plates for carrying I beams, said plates being arranged in a line one behind the other and attached in holding devices in such a manner that they can be exchanged.

18. Device according to claim 1, characterized thereby that said profile carriers are formed as grouser plates for carrying I beams, said plates being arranged in a line one behind the other and attached in holding devices in such a manner that they can be exchanged.

19. Device according to claim 18, characterized thereby that said grouser plates are affixed in said holding devices by means of bolts.

20. Device according to claim 17, characterized thereby that said grouser plates are affixed in said holding devices by means of bolts.

* * * * *